(12) United States Patent
Kanezaki et al.

(10) Patent No.: US 11,988,337 B2
(45) Date of Patent: May 21, 2024

(54) GAS CONTROL SYSTEM AND GAS CONTROL METHOD

(71) Applicant: HONDA MOTOR CO., LTD., Tokyo (JP)

(72) Inventors: Toshihiko Kanezaki, Wako (JP); Naoki Ogiwara, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 481 days.

(21) Appl. No.: 17/194,643

(22) Filed: Mar. 8, 2021

(65) Prior Publication Data

US 2021/0278048 A1 Sep. 9, 2021

(30) Foreign Application Priority Data

Mar. 9, 2020 (JP) .................. 2020-039624

(51) Int. Cl.
*F17C 13/02* (2006.01)

(52) U.S. Cl.
CPC .......... *F17C 13/026* (2013.01); *F17C 13/025* (2013.01); *F17C 2203/011* (2013.01); *F17C 2203/0604* (2013.01); *F17C 2203/066* (2013.01); *F17C 2221/012* (2013.01); *F17C 2250/032* (2013.01); *F17C 2250/043* (2013.01);
(Continued)

(58) Field of Classification Search
CPC ........ F17C 1/06; F17C 13/025; F17C 13/026; F17C 2201/0109; F17C 2201/056; F17C 2203/011; F17C 2203/0604; F17C 2203/0619; F17C 2203/066; F17C 2203/0663; F17C 2205/0305; F17C 2221/012; F17C 2223/0123; F17C 2223/036; F17C 2250/032; F17C 2250/043; F17C 2250/0439; F17C 2250/0491;
(Continued)

(56) References Cited

U.S. PATENT DOCUMENTS

| 8,435,700 B2 | 5/2013 | Okawachi et al. |
| 2015/0274006 A1 | 10/2015 | Chung |
| 2018/0266631 A1 | 9/2018 | Kanezaki |

FOREIGN PATENT DOCUMENTS

| CN | 102713403 A | 10/2012 |
| CN | 110469772 A | 11/2019 |

(Continued)

OTHER PUBLICATIONS

Office Action inncluding search report dated May 27, 2022 issued over the corresponding Chinese Patent Application No. 202110256755.8 with the English translation thereof.
(Continued)

*Primary Examiner* — Victoria H Lynch
(74) *Attorney, Agent, or Firm* — Carrier, Shende & Associates P.C.; Joseph P. Carrier; Jeffrey T. Gedeon

(57) ABSTRACT

A gas control system includes a high pressure tank, a temperature sensor, a pressure sensor, an injector, and a gas control ECU. The high pressure tank includes a liner, a reinforcing layer, and a discharge hole for discharging hydrogen gas from the liner. The temperature sensor detects the temperature of the reinforcing layer or the temperature around the outside of the high pressure tank. In the implementation of the gas control method, the gas control ECU, based on temperature information detected by the temperature sensor and pressure information detected by the pressure sensor, changes the timing of starting limiting control for limiting the discharge of hydrogen gas.

7 Claims, 11 Drawing Sheets

(52) U.S. Cl.
CPC ............... *F17C 2250/0439* (2013.01); *F17C 2250/0491* (2013.01); *F17C 2270/0168* (2013.01); *F17C 2270/0184* (2013.01)

(58) Field of Classification Search
CPC ........ F17C 2260/037; F17C 2270/0168; F17C 2270/0184; Y02E 60/32; Y02E 60/50
See application file for complete search history.

(56) References Cited

FOREIGN PATENT DOCUMENTS

| | | |
|---|---|---|
| JP | 2009-216133 A | 9/2009 |
| JP | 2012-221637 A | 11/2012 |
| JP | 2013-127295 A | 6/2013 |
| JP | 2014-001788 A | 1/2014 |
| JP | 2014-092185 A | 5/2014 |
| JP | 2018-155335 A | 10/2018 |
| KR | 101619630 B1 | 5/2016 |

OTHER PUBLICATIONS

Office Action dated Jul. 11, 2023 issued in the corresponding Japanese Patent Application 2020-039624 with the English translation thereof.

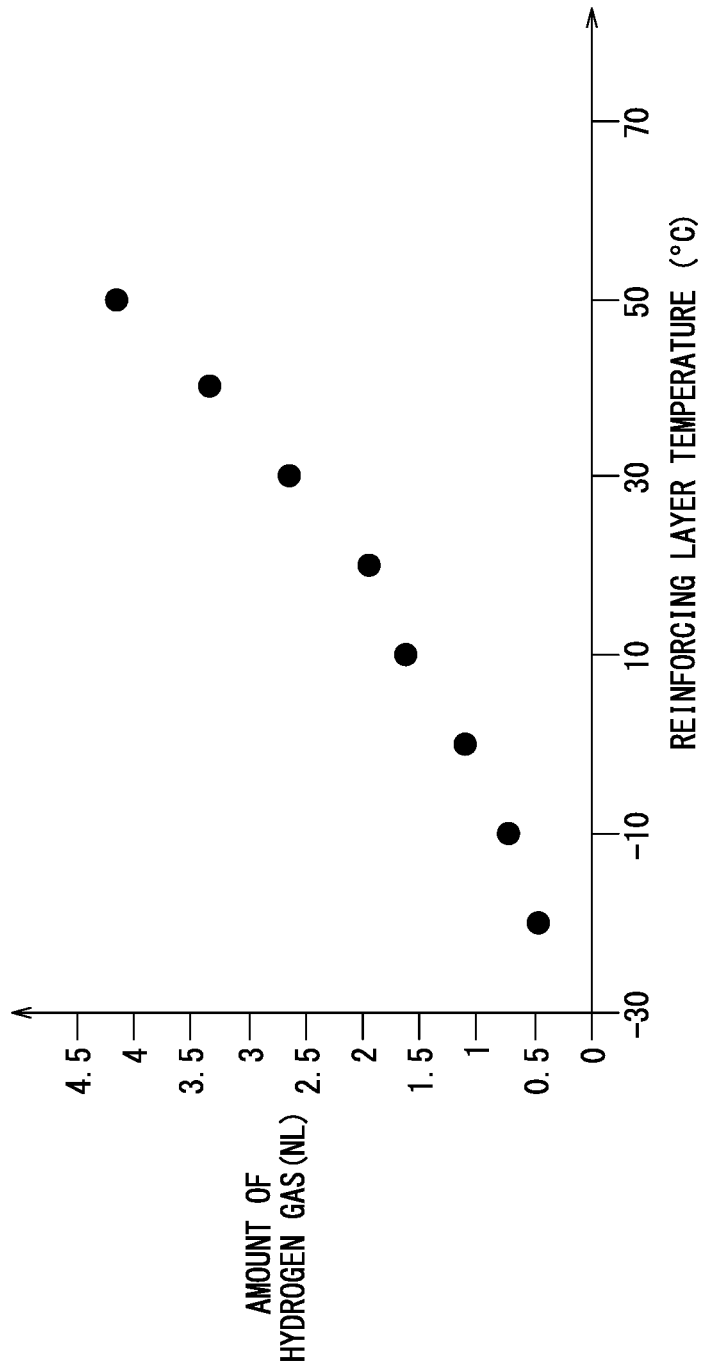

| REINFORCING LAYER TEMPERATURE (°C) | 1ST TEMPERATURE RANGE | 2ND TEMPERATURE RANGE | 3RD TEMPERATURE RANGE | 4TH TEMPERATURE RANGE | 5TH TEMPERATURE RANGE | ... |
|---|---|---|---|---|---|---|
| PRESSURE THRESHOLD (Pa) | Tp1 | Tp2 | Tp3 | Tp4 | Tp5 | ... |

| | INTERNAL PRESSURE OF HIGH PRESSURE TANK (Pa) | | | | | |
|---|---|---|---|---|---|---|
| | 1ST PRESSURE RANGE | 2ND PRESSURE RANGE | 3RD PRESSURE RANGE | 4TH PRESSURE RANGE | 5TH PRESSURE RANGE | 6TH PRESSURE RANGE |
| 1ST TEMPERATURE RANGE | Llx | Ll1 | Ll1 | Ll1 | Ll2 | Ll2 |
| 2ND TEMPERATURE RANGE | Ll1 | Ll1 | Ll1 | Ll2 | Ll2 | Ll2 |
| REINFORCING LAYER TEMPERATURE (°C) 3RD TEMPERATURE RANGE | Ll1 | Ll1 | Ll2 | Ll2 | Ll2 | Ll3 |
| 4TH TEMPERATURE RANGE | Ll1 | Ll2 | Ll2 | Ll2 | Ll3 | Ll3 |

(1ST PRESSURE RANGE < 2ND PRESSURE RANGE < 3RD PRESSURE RANGE <
4TH PRESSURE RANGE < 5TH PRESSURE RANGE < 6TH PRESSURE RANGE)
(4TH TEMPERATURE RANGE < 3RD TEMPERATURE RANGE < 2ND TEMPERATURE RANGE < 1ST TEMPERATURE RANGE)
(Ll3 < Ll2 < Ll1 < Llx)

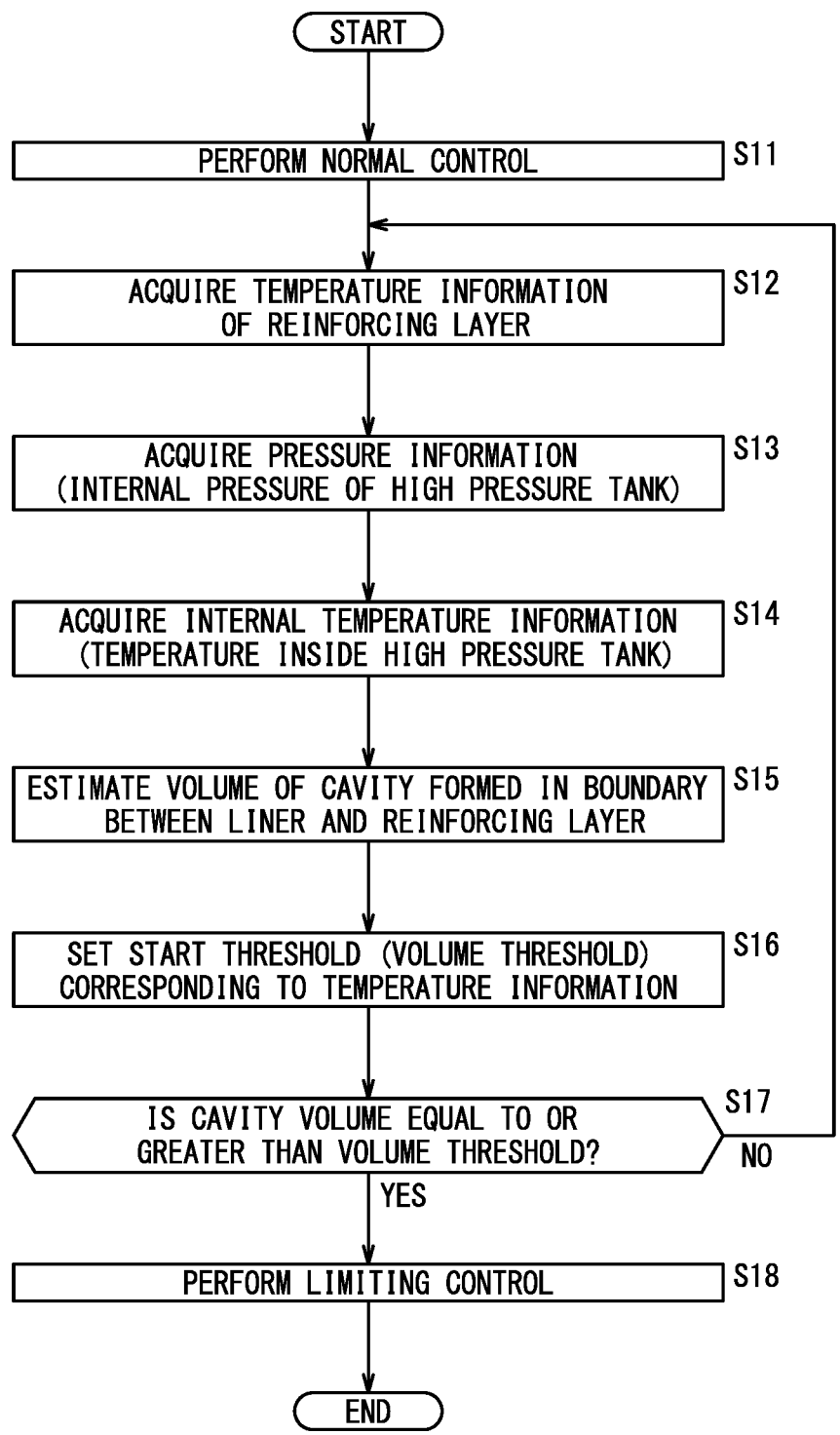

GAS CONTROL SYSTEM AND GAS CONTROL METHOD

CROSS-REFERENCE TO RELATED APPLICATION

This application is based upon and claims the benefit of priority from Japanese Patent Application No. 2020-039624 filed on Mar. 9, 2020, the contents of which are incorporated herein by reference.

BACKGROUND OF THE INVENTION

Field of the Invention

The present invention relates to a gas control system and a gas control method for controlling the flow rate of a fluid discharged from a high pressure tank.

Description of the Related Art

For example, a fuel cell system includes a high pressure tank to supply a fuel gas such as hydrogen gas to a fuel cell stack. In order to reduce the weight, this type of high pressure tank is formed of a resin liner that is filled with hydrogen gas and a reinforcing layer (for example, fiber reinforced resin: CFRP) that covers the outer surface of the liner.

Since the resin liner allows the hydrogen gas in the liner to permeate therethrough, the permeated hydrogen gas is accumulated between the liner and the reinforcing layer. In particular, when the pressure of hydrogen gas inside the liner decreases as hydrogen gas is discharged so that the pressure of the hydrogen gas permeated through the liner and collecting between the liner and the reinforcing layer becomes higher than the pressure of hydrogen gas in the liner, there is a risk that radially inward deformation of the liner (so-called buckling) occurs.

In order to prevent the buckling from occurring, for example, Japanese Laid-Open Patent Publication No. 2013-127295 discloses a system which performs such control (a control of lowering the upper limit of the flow rate to a value smaller than the maximum value) as to limit the flow rate of hydrogen gas to be discharged from the high pressure tank when the pressure of hydrogen gas in the storage space becomes equal to or lower than the pressure of permeated hydrogen gas collected between the liner and the reinforcing layer.

SUMMARY OF THE INVENTION

The amount of permeated hydrogen gas that permeates the liner (as well as the hydrogen gas concentration inside the reinforcing layer correlated with the permeation amount) is small when the temperature in the liner is low, whereas it increases as the temperature in the liner rises. The temperature in the liner is dependent on the ambient temperature around the high pressure tank. In order to suppress buckling, the conventional system is configured to perform the above limiting control on the assumption that the ambient temperature around the high pressure tank is high (in other words, the temperature in the liner is high).

However, this configuration will perform the same limiting control even in a situation where the temperature in the liner is low, hence buckling is unlikely to occur because of a low amount of permeated hydrogen gas. When hydrogen gas limiting control is performed, the amount of electric power generated by the fuel cell stack lowers, which increases the possibility of failing to supply the required power.

In addition, the temperature inside the liner is approximately equal to the ambient temperature around the high pressure tank through the liner and the reinforcing layer when the vehicle is stopped for a certain period of time. On the other hand, when the vehicle starts operating, hydrogen gas is discharged from the high pressure tank, and adiabatic expansion occurs, which changes the temperature inside the liner. Therefore, detection of the temperature inside the liner does not necessarily correlate with suitable monitoring that can monitor the hydrogen gas concentration in the reinforcing layer. It is rather better to measure the temperature of the resin reinforcing layer (or the ambient temperature itself), which is less affected by adiabatic expansion and is close to the surrounding ambient temperature even after a passage of time from the start of operation, in order to estimate the amount of permeated hydrogen gas moving from the reinforcing layer to the interstitial area between the liner and the reinforcing layer.

The present invention has been devised in view of the above circumstances, and it is therefore an object of the present invention to provide a gas control system and a gas control method which, by limiting the discharge of a fluid from the high pressure tank according to the temperature of the reinforcing layer (or the ambient temperature around the high pressure tank), can suppress deformation of the liner of a high pressure tank, and which, when the ambient temperature around the high pressure tank is low, enable a fuel cell stack to continuously operate at high power as compared to the condition where the ambient temperature is high.

In order to achieve the above object, a first aspect of the invention resides in a gas control system, comprising: a high pressure tank including a liner made of resin and filled with a highly pressurized fluid, a reinforcing layer covering an outer surface of the liner, and a discharge hole configured to discharge the fluid from the liner; a temperature sensor configured to detect a temperature of the reinforcing layer or a temperature around an outside of the high pressure tank; a pressure sensor configured to detect a pressure inside the liner; a flow rate adjustor configured to adjust a flow rate of the fluid discharged from the discharge hole; and a control unit configured to control an operation of the flow rate adjustor, wherein the control unit starts limiting control to limit discharge of the fluid, based on temperature information detected by the temperature sensor and pressure information detected by the pressure sensor.

Additionally, in order to achieve the above object, a second aspect of the invention resides in a gas control method for controlling a flow rate of a highly pressurized fluid discharged from a high pressure tank including a liner made of resin and filled with the fluid, a reinforcing layer covering an outer surface of the liner, and a discharge hole configured to discharge the fluid from the liner, the gas control method comprising a temperature acquisition step of detecting, with a temperature sensor, a temperature of the reinforcing layer or a temperature around an outside of the high pressure tank; a pressure acquisition step of detecting, with a pressure sensor, a pressure inside the liner; and a flow rate control step of controlling, with a control unit, an operation of a flow rate adjustor configured to adjust a flow rate of the fluid discharged from the liner, wherein, in the flow rate control step, limiting control to limit discharge of the fluid is started based on temperature information detected by the temperature sensor and pressure information detected by the pressure sensor.

Thus, since the above gas control system and gas control method limit the discharge of the fluid from the high pressure tank according to the temperature of the reinforcing layer (or the ambient temperature around the high pressure tank), when the ambient temperature around the high pressure tank is low, it is possible to operate the fuel cell stack continuously at high power while suppressing deformation of the liner, as compared to the condition where the ambient temperature is high.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 4 is a graph showing the relationship between the temperature of the reinforcing layer and the amount of hydrogen gas diffused in the reinforcing layer;

FIG. 6A is a chart showing an example of start map information, FIG. 6B is a diagram showing an example of limitation map information;

FIG. 11 is a flowchart showing procedures when starting limiting control from normal control in a gas control method of the second embodiment.

DESCRIPTION OF THE PREFERRED EMBODIMENTS

Figure 1:
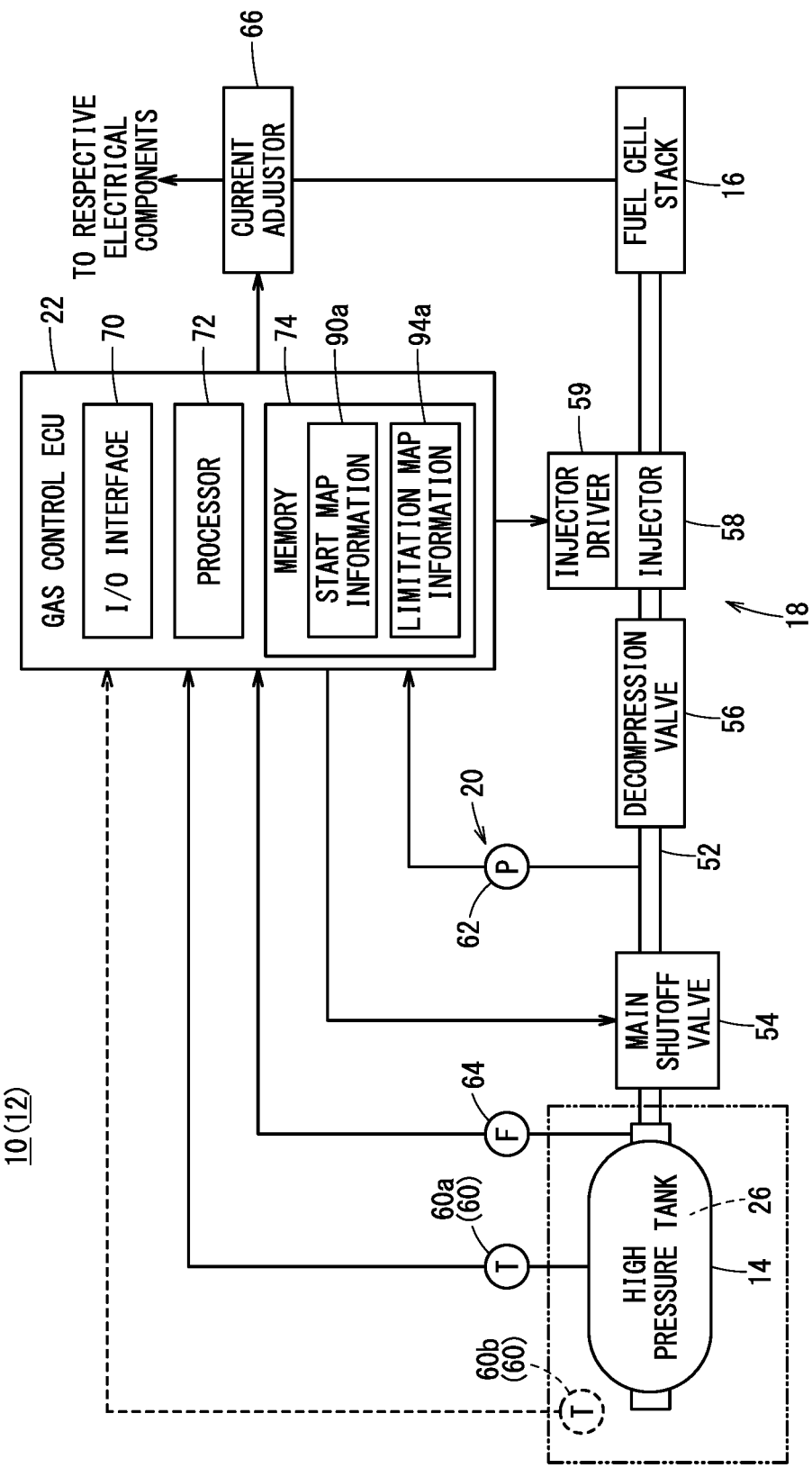
FIG. 1 is an illustrative diagram showing an overall configuration of a gas control system according to a first embodiment of the present invention.

Hereinafter, the present invention will be detailed by describing preferred embodiments with reference to the accompanying drawings.

First Embodiment

A gas control system 10 according to a first embodiment of the present invention is a hydrogen gas supply system that supplies hydrogen gas (fuel gas, anode gas) as a fluid, from a high pressure tank 14 to a fuel cell stack 16 in a fuel cell system 12. The fuel cell stack 16 generates electricity by an electrochemical reaction between hydrogen gas supplied from the high pressure tank 14 and oxygen-containing gas (oxidant gas, cathode gas) such as air supplied from another route. That is, the fuel cell stack 16 is a gas consumer that consumes hydrogen gas from the high pressure tank 14.

The fuel cell system 12 is mounted on, for example, an unillustrated fuel-cell vehicle, and supplies the generated power of the fuel cell stack 16 to electrical components (motor, battery, various ECUs, etc.) of the fuel cell vehicle. The fuel cell system 12 (gas control system 10) is not limited to the application to the fuel cell vehicle, and may be configured as a stationary type, for example.

The gas control system 10 includes the high pressure tank 14, a gas flow section 18 for connection between the high pressure tank 14 and the fuel cell stack 16 so as to allow hydrogen gas therethrough, and a sensor group 20 provided for the gas flow section 18 (or the high pressure tank 14). The gas control system 10 further includes a gas control ECU (Electronic Control Unit) 22 (controller) for controlling diverse components for regulating the gas flow state in the gas flow section 18. The gas control ECU 22 may control the gas control system 10 by communicating with a power generation control ECU 24 (see FIG. 5) for the entire fuel cell system 12, or may be installed in the power generation control ECU 24.

Figure 2:
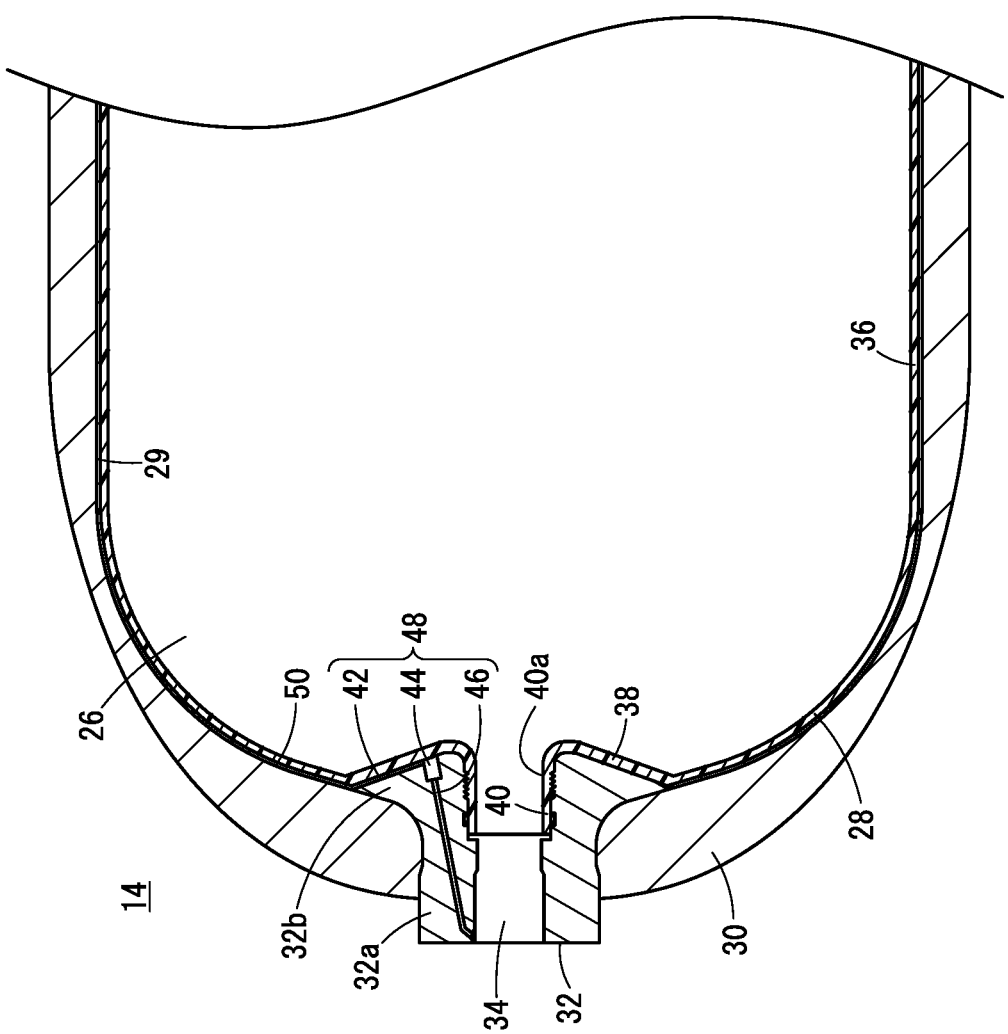
FIG. 2 is a diagram showing a sectional view partially showing a high pressure tank.

As shown in FIG. 2, the high pressure tank 14 of the gas control system 10 includes a liner 28 having a storage space 26 for keeping hydrogen gas therein, and a reinforcing layer 30 covering the outer surface of the liner 28. The high pressure tank 14 further includes a cap 32, which has a discharge hole 34 therein connected to the storage space 26 and can release hydrogen gas to the fuel cell stack 16.

The liner 28 constitutes the inner layer of the high pressure tank 14, and has a spindle-shaped main body 36, a depressed portion 38 that sinks inward in one end of the main body 36 and a fixing sleeve 40 connected to the depressed portion 38 to fix the cap 32. The main body 36, the depressed portion 38 and the fixing sleeve 40 are integrally molded of a predetermined resin material (polyamide-based resin or the like).

The storage space 26 is formed inside the main body 36. Formed on the outer surface of the main body 36 is a direct lamination of the reinforcing layer 30. The depressed portion 38 is formed in a tapered shape that is gently inclined radially inward toward the center in the longitudinal direction of the main body 36, forming a portion to which the cap 32 is mounted. The fixing sleeve 40 protrudes outward in the axial direction from the center of the depressed portion 38 and has a passage hole 40a that communicates with the storage space 26.

The reinforcing layer 30 covers the entire main body 36 of the liner 28 and a predetermined area of the cap 32 attached to the liner 28 to form the outer layer of the high pressure tank 14. As an example, carbon fiber reinforced resin (CFRP) is used for the reinforcing layer 30. The reinforcing layer 30 is formed by impregnating reinforcing fiber (carbon fiber) with a parent resin (epoxy resin or the like) while delivering the fiber to produce a fiber reinforced resin and wrapping the fiber reinforced resin on the liner 28 and the cap 32 by filament winding.

Since the high pressure tank 14 is configured in a multi-layer structure of the liner 28 and the reinforcing layer 30, the tank has a boundary 29 between the liner 28 and the reinforcing layer 30. Although FIG. 2 illustrates an after-mentioned cavity 50 that appears at the boundary 29 due to accumulation of hydrogen gas, this cavity 50 is of course not formed when the high pressure tank 14 is in a high pressure state (see also FIG. 3A).

The cap 32 of the high pressure tank 14 forms a hydrogen gas port and is arranged on the outer side of the liner 28 (depressed portion 38, fixing sleeve 40). The cap 32 includes a cap body 32a that is screw-fitted to the fixing sleeve 40 and has the discharge hole 34 penetrated therethrough capable of discharging hydrogen gas, and a flange portion 32b that projects radially outward in the bottom of the cap body 32a. In the high pressure tank 14, a part of the cap body 32a attached to the fixing sleeve 40 of the liner 28 is exposed (protruded) from the reinforcing layer 30.

Further, the cap 32 has a groove 42 that is formed in the flange portion 32b so as to allow communication with the boundary 29 between the liner 28 and the reinforcing layer 30, a buffer 44 that is connected with the groove 42, and a channel 46 that extends from the buffer 44 to the inner surface of the cap 32 forming the discharge hole 34. The groove 42, the buffer 44 and the channel 46 configure an exhaust path 48 for releasing the hydrogen gas accumulated in the boundary 29 between the liner 28 and the reinforcing layer 30 to the discharge hole 34.

Figure 3A:
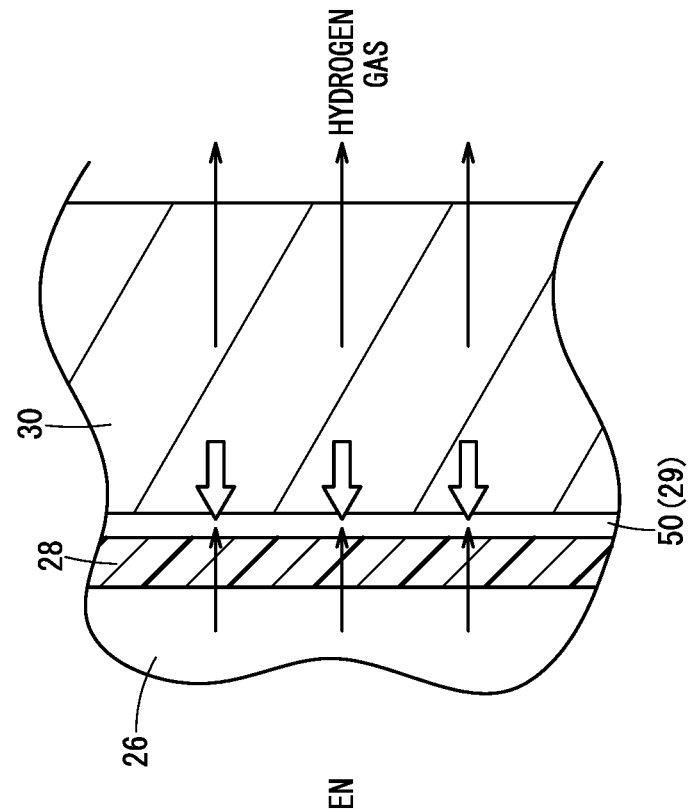
FIG. 3A is a sectional view showing a liner and a reinforcing layer when the internal pressure of the high pressure tank is high.

In the high pressure tank 14, a phenomenon occurs in which the hydrogen gas stored in the storage space 26 permeates the resin liner 28. Hereinafter, to make the present invention easy to understand, the behavior of the hydrogen gas that has permeated the liner 28 will be described. As shown in FIG. 3A, the hydrogen gas that has permeated the liner 28 moves inside the reinforcing layer 30 (CFRP). The reinforcing layer 30 is thicker in the radial direction than the liner 28. A greater amount of hydrogen gas is distributed (diffused) inside the reinforcing layer 30 than in the liner 28.

When the storage space 26 of the high pressure tank 14 is in a high pressure state, even if the hydrogen gas having permeated the liner 28 diffuses into the reinforcing layer 30, a part of the permeated hydrogen gas (or a small amount of permeated hydrogen gas) passes therethrough to the outside of the high pressure tank 14 (to the atmosphere side). That is, the hydrogen gas moves from the inside of the liner 28 toward the outside of the reinforcing layer 30. Therefore, the hydrogen gas concentration distribution in the reinforcing layer 30 becomes lower toward the outside of the reinforcing layer 30.

Figure 3B:
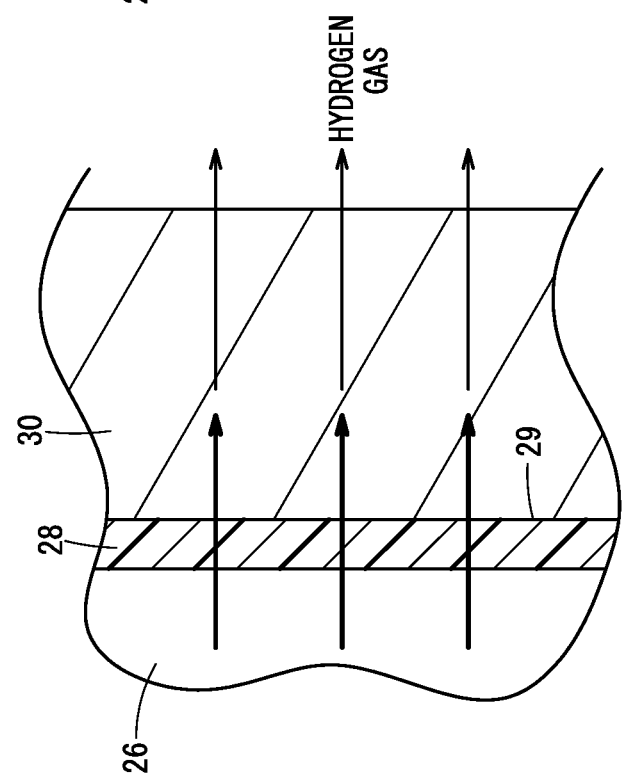
FIG. 3B is a sectional view showing the liner and the reinforcing layer when the internal pressure of the high pressure tank is low.

On the other hand, when hydrogen gas is discharged from the discharge hole 34 of the high pressure tank 14 so that the pressure in the storage space 26 lowers and the pressing force of the liner 28 acting radially outward is alleviated to a predetermined pressure level or below, the cavity 50 is formed in the boundary 29 between the liner 28 and the reinforcing layer 30, as shown in FIG. 3B. In this state, the hydrogen gas that has permeated the liner 28 and diffused in the reinforcing layer 30 acts (moves) toward the cavity 50 (inside the reinforcing layer 30) as the storage space 26 is decompressed.

In the high pressure tank 14, when the cavity 50 is formed in the boundary 29, the exhaust path 48 and the cavity 50 communicate with each other so that the hydrogen gas in the cavity 50 can be discharged through the exhaust path 48. However, when the rate of decompression of the storage space 26 due to the release of hydrogen gas from the discharge hole 34 exceeds the rate of decompression of the cavity 50 due to the exhaust of permeated hydrogen gas from the cavity 50 so that the pressure in the cavity 50 increases and reaches the limit or greater, a buckling in which a part of the liner 28 is recessed inward occurs.

Further, as shown in the graph of FIG. 4, the amount of hydrogen gas (hydrogen gas concentration) diffused in the reinforcing layer 30 increases as the interior temperature of the liner 28 increases. As described above, when the vehicle is stopped for a certain period of time, the temperatures of the reinforcing layer 30, the liner 28 and the interior of the liner 28 are substantially equal to the ambient temperature around the high pressure tank 14. Therefore, it can be expected that the amount of hydrogen gas (hydrogen gas concentration) diffused in the reinforcing layer 30 increases as the temperature of the reinforcing layer 30 (ambient temperature around the high pressure tank 14) increases.

As the vehicle starts operating, the hydrogen gas in the liner 28 is discharged to the outside of the high pressure tank 14, and the pressure of the storage space 26 becomes low. When the pressure of the storage space 26 becomes equal to or lower than a predetermined pressure, the cavity 50 is formed in the boundary 29 between the liner 28 and the reinforcing layer 30. In this process, the temperature inside the liner 28 changes due to adiabatic expansion of hydrogen gas inside the liner 28. On the other hand, the reinforcing layer 30 is hardly affected by the adiabatic expansion of hydrogen gas. That is, even if the temperature inside the liner 28 changes, the temperature of the reinforcing layer 30 can be used as a reliable parameter that represents the amount of hydrogen gas diffused in the reinforcing layer 30.

Therefore, when the pressure of the storage space 26 becomes equal to the predetermined pressure or lower and the cavity 50 is generated in the boundary 29 between the liner 28 and the reinforcing layer 30, the amount of hydrogen gas moving to the cavity 50 changes depending on the temperature of the reinforcing layer 30 or the ambient temperature around the high pressure tank 14. In other words, the amount of hydrogen gas diffused in the reinforcing layer 30 moving to the boundary 29 (the pressure of hydrogen in the cavity 50) increases as the temperature of the reinforcing layer 30 or the ambient temperature around the high pressure tank 14 increases, and the liner 28 is likely to cause a buckling at the stage when the internal pressure of the high pressure tank 14 is high.

In order to suppress this buckling, the gas control system 10 according to the present embodiment performs limiting control to limit the flow rate of hydrogen gas supplied to the fuel cell stack 16 (gas flow section 18) in the course of reducing the pressure (internal pressure) of the storage space 26 in the high pressure tank 14. Next, a configuration for performing the limiting control in the gas control system 10 will be described.

Returning to FIG. 1, the gas flow section 18 constitutes a flow path for supplying hydrogen gas from the high pressure tank 14 to the fuel cell stack 16 under the control of the gas control ECU 22. This gas flow section 18 has a gas supply pipe 52 extending between the high pressure tank 14 and the fuel cell stack 16 to allow hydrogen gas to flow therethrough. The gas flow section 18 further includes a main shutoff valve 54, a decompression valve 56 and an injector 58 at appropriate positions on the gas supply pipe 52 (including the high pressure tank 14).

The main shutoff valve 54 is provided on the cap 32 of the high pressure tank 14 or the gas supply pipe 52, and opens and closes according to a control signal output from the gas control ECU 22 to open or shut off the flow path of the gas supply pipe 52. The decompression valve 56 is provided downstream of the main shutoff valve 54 to reduce the pressure of hydrogen gas flowing from the gas supply pipe 52 toward the fuel cell stack 16.

One or more injectors 58 are provided downstream of the decompression valve 56, and are operated to open and close so that hydrogen gas on the upstream side (high pressure tank 14 side) of the injector(s) 58 presents a predetermined pressure, and inject hydrogen gas to the downstream side (fuel cell stack 16). The injector 58 is driven by an injector driver 59 that receives a control signal from the gas control ECU 22. That is, the injector 58 corresponds to a flow rate adjustor that adjusts the amount of supply (flow rate) of hydrogen gas from the high pressure tank 14 to the fuel cell stack 16.

The sensor group 20 of the gas control system 10 monitors the state of hydrogen gas in the hydrogen gas supply system, and examples of the sensor group 20 include a temperature sensor 60, a pressure sensor 62 and a flow rate sensor 64.

The temperature sensor 60 according to the present embodiment is a detector that detects the temperature of the reinforcing layer 30 itself. For example, as the temperature sensor 60 of this type, a radiation temperature sensor 60a that detects the radiation temperature of the reinforcing layer 30 can be applied. The temperature sensor 60 may be configured such that a detecting element is directly attached to the reinforcing layer 30. Further, as shown by the dotted line in FIG. 1, an outside air temperature sensor 60b that detects the outside air temperature (ambient temperature) around the outside of the high pressure tank 14 can be applied as the temperature sensor 60. The outside air temperature sensor 60b may and should be installed at a location that is not easily affected by the airflow during the vehicle running and other situations. In a condition where the vehicle is stopped for a certain period of time, the reinforcing layer 30 constituting the outer layer of the high pressure tank 14 is directly affected by the outside air temperature, so that the temperature of the reinforcing layer 30 itself and the outside air temperature around the reinforcing layer 30 are correlated (there is substantially no difference). Further, the reinforcing layer 30 is not easily affected by the adiabatic expansion of hydrogen gas inside the liner 28 even after the vehicle starts operating, so that the temperature of the reinforcing layer 30 can be said to be a good indicator for the amount of permeated hydrogen gas moving from the reinforcing layer 30 to the cavity 50.

In particular, the reinforcing layer 30 in the present embodiment is made of a fiber resin, and the radial thickness of the reinforcing layer 30 is formed to be thicker than the radial thickness of the liner 28. Therefore, the reinforcing layer 30 is less susceptible to the adiabatic expansion of hydrogen gas, so that the amount of hydrogen gas diffused in the reinforcing layer 30 and the amount of the diffused hydrogen gas moving from the reinforcing layer 30 to the cavity 50 are more likely to correlate with the ambient temperature around the high pressure tank 14.

The temperature sensor 60 may use either the radiation temperature sensor 60a or the outside air temperature sensor 60b, but the two sensors are used to appropriately process the two pieces of temperature information (by taking the average, adopting the higher temperature, by adopting one temperature corrected based on the other, or other ways). Further, the obtained temperature information may be updated as appropriate. Specifically, when the temperature information obtained by the radiation temperature sensor 60a or the outside air temperature sensor 60b is updated to a high level, the updated temperature information may be adopted.

The pressure sensor 62 detects the pressure of the storage space 26 in the liner 28 (internal pressure of the high pressure tank 14). In the present embodiment, the pressure sensor 62 is configured to detect the pressure of hydrogen gas flowing through the gas supply pipe 52 between the main shutoff valve 54 and the decompression valve 56. The pressure sensor 62 may directly detect the pressure in the liner 28, or may detect the pressure of hydrogen gas flowing through the gas supply pipe 52 on the upstream side of the main shutoff valve 54.

Further, the flow rate sensor 64 detects the flow rate through the exhaust path 48 of the high pressure tank 14. The sensor group 20 is not limited to the pressure sensor 62, the temperature sensor 60 and the flow rate sensor 64 described above, and may include other types of sensors.

The gas control system 10 may include a current adjustor 66 that adjusts the generated current output from the fuel cell stack 16. The current adjustor 66 can implement a limiting control for limiting the generated current of the fuel cell stack 16. The current adjustor 66 performs limiting control of the generated current under the control of the gas control ECU 22, thereby suppresses consumption of hydrogen gas consumed in the fuel cell stack 16. This control reduces the flow rate of hydrogen gas from the high pressure tank 14, hence the speed of reducing the pressure of the high pressure tank 14 lowers. That is, the current adjustor 66 can provide the function of a flow rate adjustor in the present invention, which adjusts the flow rate of hydrogen gas.

Then, the gas control ECU 22 of the gas control system 10 uses the temperature information detected by the temperature sensor 60 and the pressure information detected by the pressure sensor 62 to set the start timing of the aforementioned limiting control and the flow rate of hydrogen gas at the time of the limiting control. The gas control ECU 22 is a computer having an input/output interface 70, one or more processors 72 and a memory 74, and is connected to the injector 58, the main shutoff valve 54 and each of the sensors of the sensor group 20 via the input/output interface 70.

Figure 5:
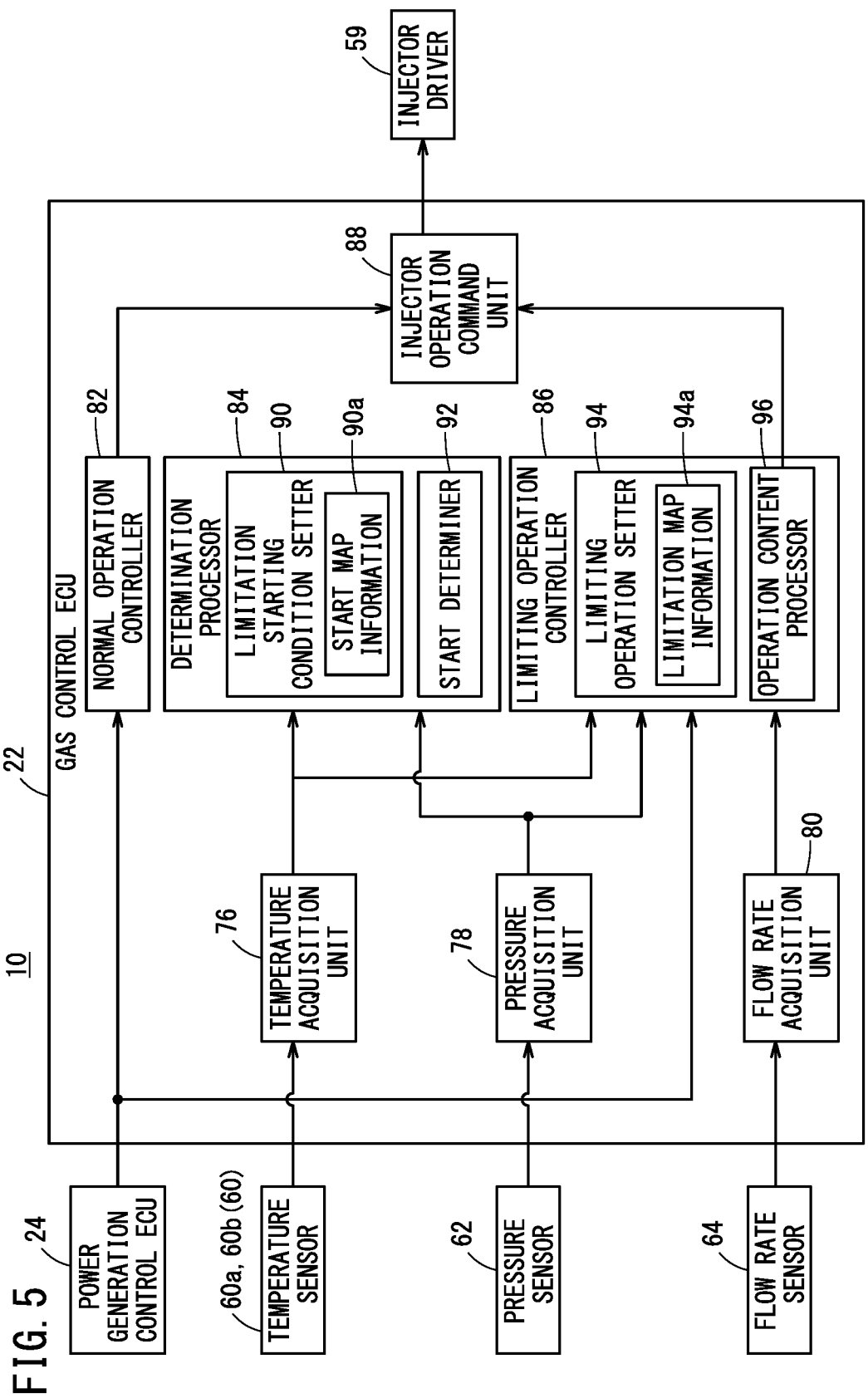
FIG. 5 is a block diagram showing the function of a gas control ECU.

The one or more processors 72 run the programs (not shown) stored in the memory 74 to configure functional units that regulate the flow rate of hydrogen gas. As shown in FIG. 5, in the gas control ECU 22, a temperature acquisition unit 76, a pressure acquisition unit 78, a flow rate acquisition unit 80, a normal operation controller 82, a determination processor 84, a limiting operation controller 86, and an injector operation command unit 88 are configured.

The temperature acquisition unit 76 acquires temperature information detected by the temperature sensor 60, temporarily stores it in the memory 74 and outputs the temperature information to the determination processor 84 and the limiting operation controller 86. Similarly, the pressure acquisition unit 78 acquires pressure information detected by the pressure sensor 62, temporarily stores it in the memory 74 and outputs the pressure information to the determination processor 84 and the limiting operation controller 86. Further, the flow rate acquisition unit 80 acquires flow rate information detected by the flow rate sensor 64, temporarily stores it in the memory 74 and outputs the flow rate information to the limiting operation controller 86.

The normal operation controller 82 is a functional unit that performs normal control in a state where the pressure (internal pressure) of the storage space 26 of the high pressure tank 14 is high. For example, the normal operation controller 82 sets the operation content of the injector 58 (the duty ratio, which is the opening/closing period of the unillustrated valve in the injector 58) based on the instructions from the power generation control ECU 24 or the like. In this case, the normal operation controller 82 sets a normal-mode flow rate upper limit Lc (see FIG. 9) of hydrogen gas in conformity with the capacity of the gas flow section 18, and sets the operation content of the injector 58 so that the flow rate of hydrogen gas under normal control will not exceed the normal-mode flow rate upper limit Lc. Then, the normal operation controller 82 outputs the operation content of the injector 58 thus set to the injector operation command unit 88.

The determination processor 84, based on the temperature information and pressure information, switches operation modes between the operation by the normal operation controller 82 (the normal control of the high pressure tank 14 at high pressure) and the operation by the limiting operation controller 86 (the limited control of the high pressure tank 14 at low pressure). Here, the liner 28 causes a buckling when the pressure (internal pressure) of the storage space 26 of the high pressure tank 14 becomes low due to the release of hydrogen gas as described above. Therefore, a switching from the normal control to the limiting control (that is, a decision of the start timing of the limiting control) is made on condition that the internal pressure becomes a predetermined value or lower, as a result of monitoring the pressure information.

When the vehicle has stopped for a certain period of time and the ambient temperature around the high pressure tank 14 is high, the amount of hydrogen gas moving to the reinforcing layer 30 increases as the temperatures of the reinforcing layer 30, the liner 28 and the interior of the liner 28 become higher. That is, as the temperature of the reinforcing layer 30, or the outside air temperature around the high pressure tank 14, detected by the temperature sensor 60 becomes higher, the amount of hydrogen gas moving to the boundary 29 between the liner 28 and the reinforcing layer 30 increases. Therefore, it is preferable that the limiting control is started earlier as the temperature of the reinforcing layer 30 is higher. On the other hand, the limiting control limits the flow rate of hydrogen gas released from the high pressure tank 14, hence increasing the risk that the required power cannot be obtained from the power generation of the fuel cell stack 16. Therefore, in a case where the temperature of the reinforcing layer 30 is low, hence there is a low amount of hydrogen gas moving to the boundary 29 due to a low temperature environment or other influence, it is preferable that the start timing of the limiting control is delayed.

From the above, the determination processor 84 includes a limitation starting condition setter 90 that sets a start threshold Ts, and a start determiner 92 that determines the start timing of the limiting control based on the set start threshold Ts. The limitation starting condition setter 90 sets a pressure threshold Tp (start threshold Ts) to be compared to the internal pressure of the high pressure tank 14 based on the temperature information of the reinforcing layer 30. For example, as shown in FIG. 6A, the limitation starting condition setter 90 previously stores, in the memory 74, start map information 90a including multiple values for the start threshold Ts, each associated with a temperature range of the reinforcing layer 30, and reads out the start map information 90a to extract a value for the start threshold Ts based on the temperature information.

The start map information 90a has multiple values for the start threshold Ts (pressure threshold values Tp1, Tp2, . . . ) associated with respective temperature ranges (1st temperature range, 2nd temperature range, . . . ). In this start map information 90a, the temperature ranges sequentially increase in such an order that 1st temperature range<2nd temperature range<3rd temperature range<4th temperature range<5th temperature range< . . . . The temperature width of each temperature range can be set appropriately depending on the temperature of the reinforcing layer 30 and the movement of hydrogen gas. All the temperature ranges may have the same temperature width (e.g., 10° C. for each, etc.), or may have temperature widths different from each other.

Further, in the start map information 90a, the start threshold Ts (pressure threshold Tp) is also set so as to increase stepwise as the temperature range becomes higher, specifically, the pressure threshold Tp1 for 1st temperature range<the pressure threshold Tp2 for 2nd temperature range<the pressure threshold Tp3 for 3rd temperature range<the pressure threshold Tp4 for 4th temperature range<the pressure threshold Tp5 for 5th temperature range< . . . . Thus, the limitation starting condition setter 90 can set a higher pressure threshold Tp as the temperature of the reinforcing layer 30 is higher. It should be noted that the limitation starting condition setter 90 may have an appropriate function correlating the temperature information with the start threshold Ts, instead of the start map information 90a, and set a start threshold Ts using this function.

The start determiner 92 compares the start threshold Ts (pressure threshold Tp) set by the limitation starting condition setter 90 with the pressure information (internal pressure of the high pressure tank 14). The start determiner 92 determines to continue the normal control when the internal pressure of the high pressure tank 14 is higher than the pressure threshold Tp, whereas determines to start limiting control when the internal pressure of the high pressure tank 14 is equal to or lower than the pressure threshold Tp. Then, when start of the limiting control is determined, the determination processor 84 gives instructions to switch operation modes from the operation by the normal operation controller 82 to the operation by the limiting operation controller 86.

The limiting operation controller 86 sets a limiting-mode flow rate upper limit Ll (see also FIG. 9: flow rate upper limit L) that is lower than the normal-mode flow rate upper limit Lc (see also FIG. 9: flow rate upper limit L) of hydrogen gas set by the normal operation controller 82, to thereby perform limiting control for limiting the flow rate of the hydrogen gas discharged from the high pressure tank 14. For this limiting control, the limiting operation controller 86 has a limiting operation setter 94 for setting the limiting-mode flow rate upper limit Ll based on the temperature information and the pressure information. The limiting operation setter 94 previously stores limitation map information 94a in the memory 74, and reads the limitation map information 94a to extract therefrom an appropriate value for the limiting-mode flow rate upper limit Ll.

The limitation map information 94a is information in which the internal pressure of the high pressure tank 14 and the temperature of the reinforcing layer 30 are associated with values for the limiting-mode flow rate upper limit Ll. For example, the limitation map information 94a in FIG. 6B presents four values of the flow rate upper limit L (Llx, Ll1 to Ll3) associated with multiple pressure ranges (1st to 6th pressure ranges) and multiple temperature ranges (1st to 4th temperature ranges).

Multiple pressure ranges are obtained by dividing the whole range of the internal pressure P of the high pressure tank 14 from the lower limit to the upper limit, and include 1st pressure range, 2nd pressure range, 3rd pressure range, 4th pressure range, 5th pressure range and 6th pressure range, which increase in this order. Multiple temperature ranges are obtained by dividing the range of the temperature of the reinforcing layer 30 from the lowest temperature to a predetermined temperature, and increase in the order of the 4th temperature range, the 3rd temperature range, the 2nd temperature range, and the 1st temperature range. The limiting operation setter 94 extracts a value for the limiting-mode flow rate upper limit Ll, from four levels (Ll3<Ll2<Ll1<Llx) with reference to the limitation map information 94a.

Additionally, the limiting operation controller 86 includes an operation content processor 96 that sets the operation content of the injector 58 in order to adjust the flow rate of hydrogen gas output to the fuel cell stack 16. The operation content processor 96 basically sets the operation content (duty ratio of the injector 58) of the injector 58 based on a command from the power generation control ECU 24 or the like. Along with this, the operation content processor 96 appropriately limits the flow rate of hydrogen gas from the injector 58, within the range having the limiting-mode flow rate upper limit Ll set by the limiting operation setter 94 as the upper limit. It should be noted that the operation content processor 96 may have an appropriate function correlating the temperature information and the pressure information with the flow rate upper limit L instead of the limitation map information 94a, and set a flow rate upper limit L using the function.

Figure 7:
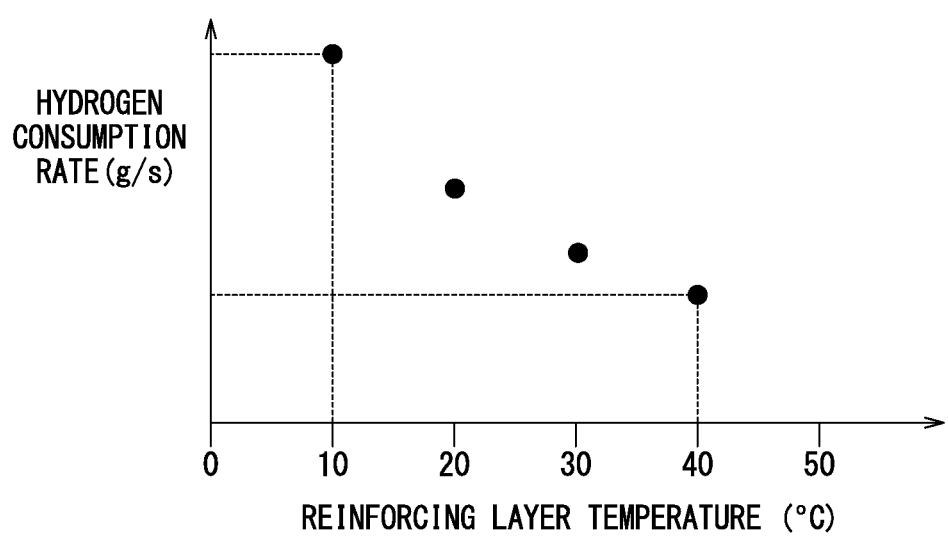
FIG. 7 is a graph showing the relationship between the temperature of the reinforcing layer and the hydrogen gas consumption rate.

The gas control system 10 thus configured implements a limiting control, whereby the flow rate of hydrogen gas can be changed according to the temperature of the reinforcing layer as shown in FIG. 7. In FIG. 7, the horizontal axis represents the temperature of the reinforcing layer 30, and the vertical axis represents the hydrogen gas consumption rate of the fuel cell stack 16. The hydrogen gas consumption rate of the fuel cell stack 16 is substantially the same as the flow rate of hydrogen gas flowing into the fuel cell stack 16 (released from the high pressure tank 14) by the fuel gas supply system.

That is, in the limiting control, by appropriately setting the limiting-mode flow rate upper limit Ll, the flow rate of hydrogen gas (hydrogen gas consumption rate) is lowered as the temperature of the reinforcing layer 30 rises, whereas the flow rate of hydrogen gas is increased as the temperature of the reinforcing layer 30 lowers. For example, as shown in FIG. 7, the hydrogen gas consumption rate when the temperature of the reinforcing layer 30 is 10° C., is higher than that when the temperature of the reinforcing layer 30 is 40° C.

Returning to FIG. 5, the limiting operation controller 86 adjusts the operation content of the injector 58 by considering the flow rate information (the flow rate of hydrogen gas from the exhaust path 48) detected by the flow rate sensor 64. For example, when only a minute amount of hydrogen gas flows out from the exhaust path 48, the flow rate (discharge rate) of hydrogen gas corresponding to the target amount of power generation is reduced so as to suppress the lowering speed of the internal pressure of the high pressure tank 14. This makes it possible to prevent the high pressure tank 14 from causing a buckling more reliably. Note that provision of a configuration for monitoring the flow rate of the exhaust path 48 is not prerequisite.

Further, the injector operation command unit 88 outputs a drive signal (for example, a pulse signal) for driving the injector driver 59 based on the operation contents output from the normal operation controller 82 and the limiting operation controller 86. As a result, the injector 58 opens and closes the valves under the control of the gas control ECU 22 to adjust the flow rate of hydrogen gas in the gas supply pipe 52. That is, the flow rate of the hydrogen gas discharged from the high pressure tank 14 can be controlled.

The gas control system 10 according to the present embodiment is basically configured as described above, and its operation will be described hereinbelow.

Upon power generation of the fuel cell system 12, the gas control system 10 is operated to supply hydrogen gas from the high pressure tank 14 to the fuel cell stack 16 via the gas flow section 18. The fuel cell stack 16 generates electricity by an electrochemical reaction between hydrogen gas and air. In supplying hydrogen gas, the gas control ECU 22 controls the operation of the gas flow section 18 (injector 58) to adjust the flow rate of the hydrogen gas to be discharged from the high pressure tank 14.

Figure 8A:
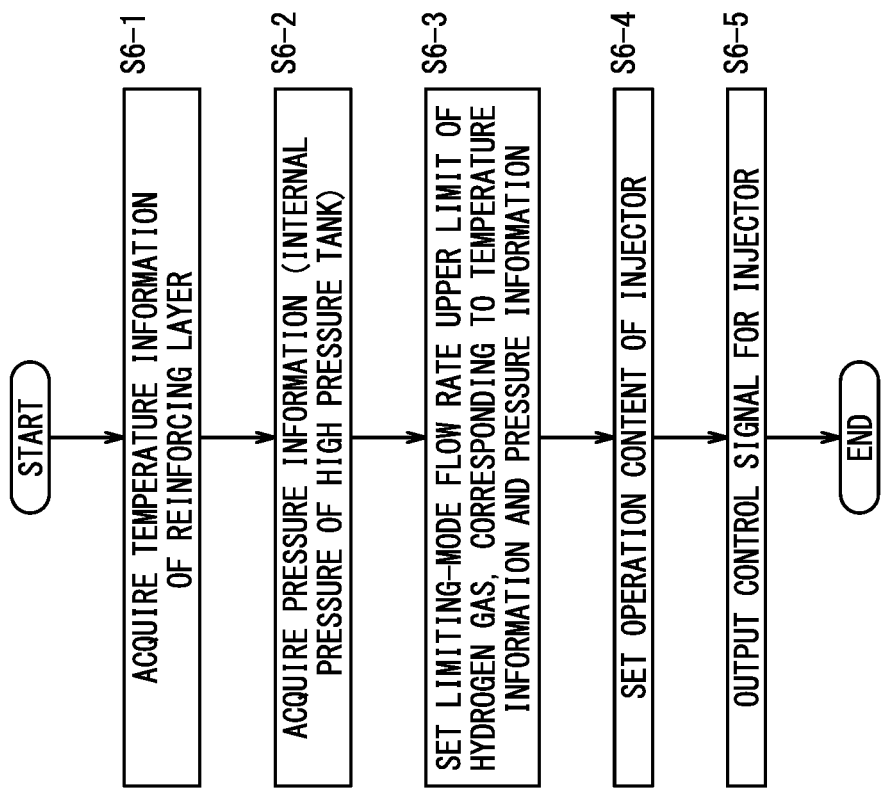
FIG. 8A is a flowchart showing procedures when starting limiting control from normal control.

Specifically, as shown in FIG. 8A, the normal operation controller 82 operates the injector 58 based on the command of the power generation control ECU 24 when the high pressure tank 14 is in the high pressure state and performs normal control for adjusting the flow rate of hydrogen gas (Step S1). During this, the normal operation controller 82 sets the normal-mode flow rate upper limit Lc according to the supply capacity of the gas flow section 18, and operates the injector 58 so that the hydrogen gas flow rate does not exceed the normal-mode flow rate upper limit Lc.

During the implementation of the normal control, the gas control ECU 22 acquires, using the temperature acquisition unit 76, the temperature information of the reinforcing layer 30 detected by the temperature sensor 60 (step S2), and acquires, using the pressure acquisition unit 78, the pressure information (the internal pressure of the high pressure tank 14) detected by the pressure sensor 62 (step S3).

Then, the gas control ECU 22 performs a flow rate control step for implementing a limiting control. Specifically, the limitation starting condition setter 90 in the determination processor 84 refers to the start map information 90a in the memory 74 as shown in FIG. 6A, and sets a start threshold Ts (pressure threshold Tp) corresponding to the acquired temperature information (step S4).

Thereafter, the start determiner 92 in the determination processor 84 compares the pressure information with the set pressure threshold Tp, and determines whether or not the internal pressure of the high pressure tank 14 is equal to or lower than the pressure threshold Tp (step S5). That is, the determination processor 84 determines the start timing of the limiting control. When the internal pressure of the high pressure tank 14 is higher than the pressure threshold Tp (step S5: NO), the process returns to step S2 and the same flow is repeated. When the internal pressure of the high pressure tank 14 is equal to or lower than the pressure threshold Tp (step S5: YES), the process proceeds to step S6.

The case in which the internal pressure of the high pressure tank 14 is equal to or lower than the pressure threshold Tp means a state that the hydrogen gas in the high pressure tank 14 has decreased and the internal pressure has lowered (decompression state). Therefore, at step S6, the determination processor 84 switches operation modes from the operation by the normal operation controller 82 to the operation by the limiting operation controller 86, so that the gas control ECU 22 starts to implement limiting control.

Needless to say, the gas control method is not limited to the above processing flow. For example, the procedures of setting the pressure threshold Tp based on the temperature information of the temperature sensor 60 (steps S2 and S4) may be done before the start of operation of the vehicle (before execution of the normal control (step S1)). This is because the amount of permeated hydrogen gas moving to the reinforcing layer 30 (hydrogen gas concentration) correlates with the ambient temperature around the high pressure tank 14 when the vehicle has stopped for a certain period of time.

Figure 8B:
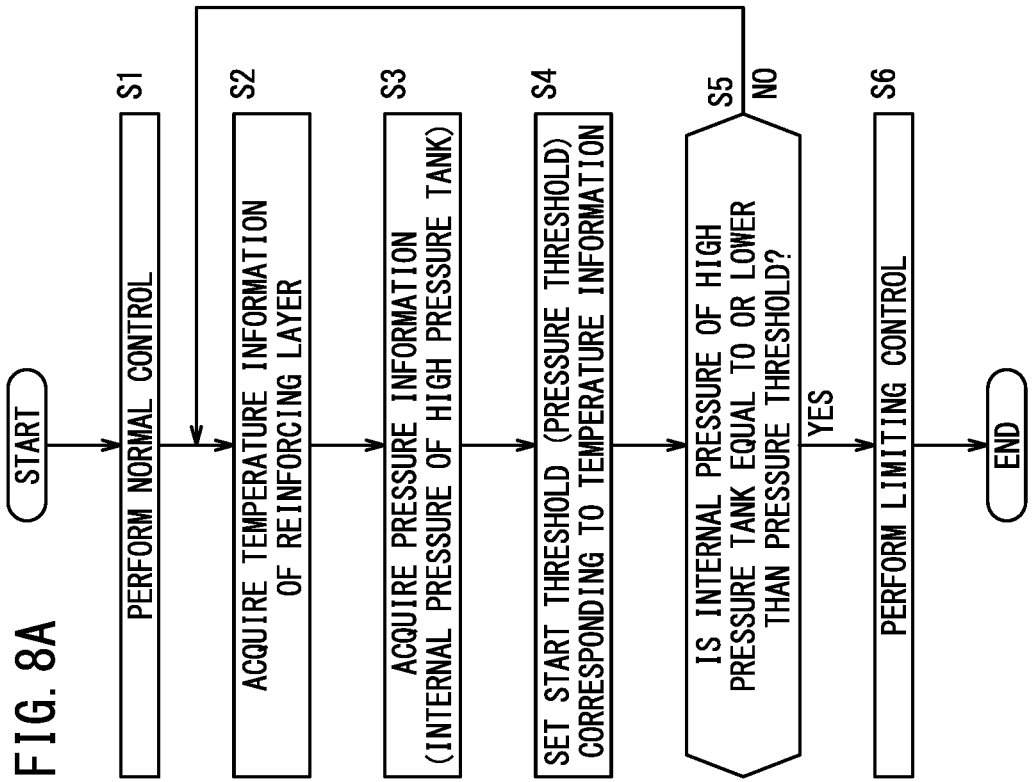
FIG. 8B is a flowchart showing procedures of limiting control.

As shown in FIG. 8B, in the limiting control, the gas control ECU 22 acquires, using the temperature acquisition unit 76, the temperature information of the reinforcing layer 30 detected by the temperature sensor 60 (step S6-1), as in the normal control. Further, the gas control ECU 22 acquires, using the pressure acquisition unit 78, the pressure information (the internal pressure of the high pressure tank 14) detected by the pressure sensor 62 (step S6-2).

Then, the limiting operation setter 94 in the limiting operation controller 86 refers to the limitation map information 94a, and sets the flow rate upper limit L (limiting-mode flow rate upper limit Ll) of hydrogen gas, corresponding to the temperature information and the pressure information (step S6-3). Then, the operation content processor 96, based on the set limiting-mode flow rate upper limit Ll, sets operation content (duty ratio) of the injector 58 for adjusting the flow rate of hydrogen gas under the command of the power generation control ECU 24 (step S6-4). That is, the operation content of the injector 58 is set so that the flow rate of the hydrogen gas will not exceed the limiting-mode flow rate upper limit Ll.

The injector operation command unit 88 of the gas control ECU 22 outputs a control signal for operating the injector 58 based on the operation content of the injector 58 set by the operation content processor 96 (step S6-5). Thereby, the hydrogen gas released from the high pressure tank 14 is appropriately limited, so that the reduction in the internal pressure of the high pressure tank 14 is suppressed (the decompression rate becomes slow). As a result, buckling of the liner 28 is well suppressed.

Figure 9:
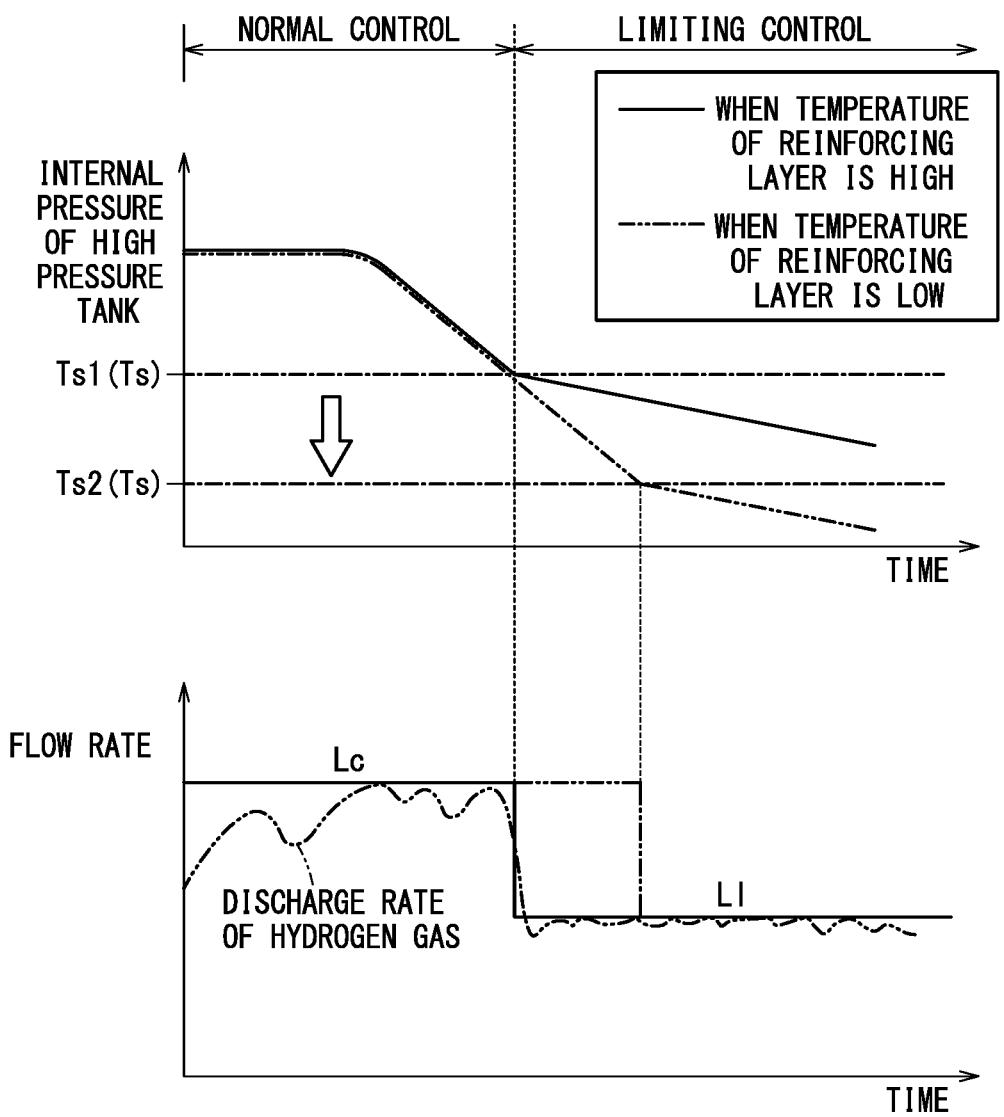
FIG. 9 has graphs showing change in the internal pressure of the high pressure tank and limitation on the flow rate of hydrogen gas with the passage of time.

Referring next to the graphs in FIG. 9, the relationship between change in the internal pressure of the high pressure tank 14 and the limitation of the flow rate of hydrogen gas in the normal control and the limiting control will be described. The upper graph in FIG. 9 exemplifies change in the internal pressure of the high pressure tank 14 with the passage of time, where the horizontal axis represents time and the vertical axis represents the internal pressure of the high pressure tank 14. On the other hand, the lower graph in FIG. 9 exemplifies change in the flow rate of hydrogen gas with the passage of time, where the horizontal axis represents time and the vertical axis represents the flow rate (discharge rate) of hydrogen gas.

As described above, the gas control ECU 22 sets the start threshold Ts (the pressure threshold Tp) based on the temperature (temperature information) of the reinforcing layer 30. Therefore, when the temperature of the reinforcing layer 30 is high, the gas control ECU 22 sets a value for the start threshold Ts (a 1st start threshold Ts1) representing high pressure, and compares the internal pressure (pressure information) of the high pressure tank 14 with the 1st start threshold Ts1. For the 1st start threshold Ts1, for example, Tp5 in the start map information 90a in FIG. 6A is applied. Then, when the internal pressure of the high pressure tank 14 becomes equal to or lower than the 1st start threshold Ts1, the limiting control is started.

That is, the gas control ECU 22 sets the limiting-mode flow rate upper limit Ll lower than the normal-mode flow rate upper limit Lc set in the normal control and adjusts the flow rate of the hydrogen gas so as not to exceed the limiting-mode flow rate upper limit Ll. As described above, the limiting-mode flow rate upper limit Ll is set at an appropriate value based on the temperature information and the pressure information. As a result, in the limiting control, the internal pressure of the high pressure tank 14 gradually decreases, and the liner 28 is prevented from buckling.

On the other hand, when the temperature of the reinforcing layer 30 is low, the gas control ECU 22 sets a value for the start threshold Ts (a 2nd start threshold Ts2) representing a pressure lower than the 1st start threshold Ts1, and compares the internal pressure (the pressure information) of the high pressure tank 14 with the 2nd start threshold Ts2. For the 2nd start threshold Ts2, for example, Tp1 in the start map information 90a in FIG. 6A is applied.

As a result, the start timing of the limiting control when the 2nd start threshold Ts2 is used is delayed compared to the start timing of the limiting control when the 1st start threshold Ts1 is used. Therefore, the time until the limiting-mode flow rate upper limit Ll is lowered is elongated, so that the fuel cell stack 16 can generate electricity corresponding to the target amount of power for a longer time. That is, the commercial value of the fuel cell system 12 can be further enhanced.

Yet, even if the start timing of the limiting control is delayed in this way, the amount of hydrogen gas accumulated in the boundary 29 between the liner 28 and the reinforcing layer is small because the temperature of the reinforcing layer 30 is low. Therefore, the liner 28 is well prevented from buckling.

The present invention is not limited to the above embodiment, and various modifications can be made according to the gist of the invention. For example, the gas control system is not limited to the application to the hydrogen gas supply system of the fuel cell system 12, and can be applied to various devices that discharge a gas stored in the storage space 26 of the high pressure tank 14.

Second Embodiment

Figure 10:
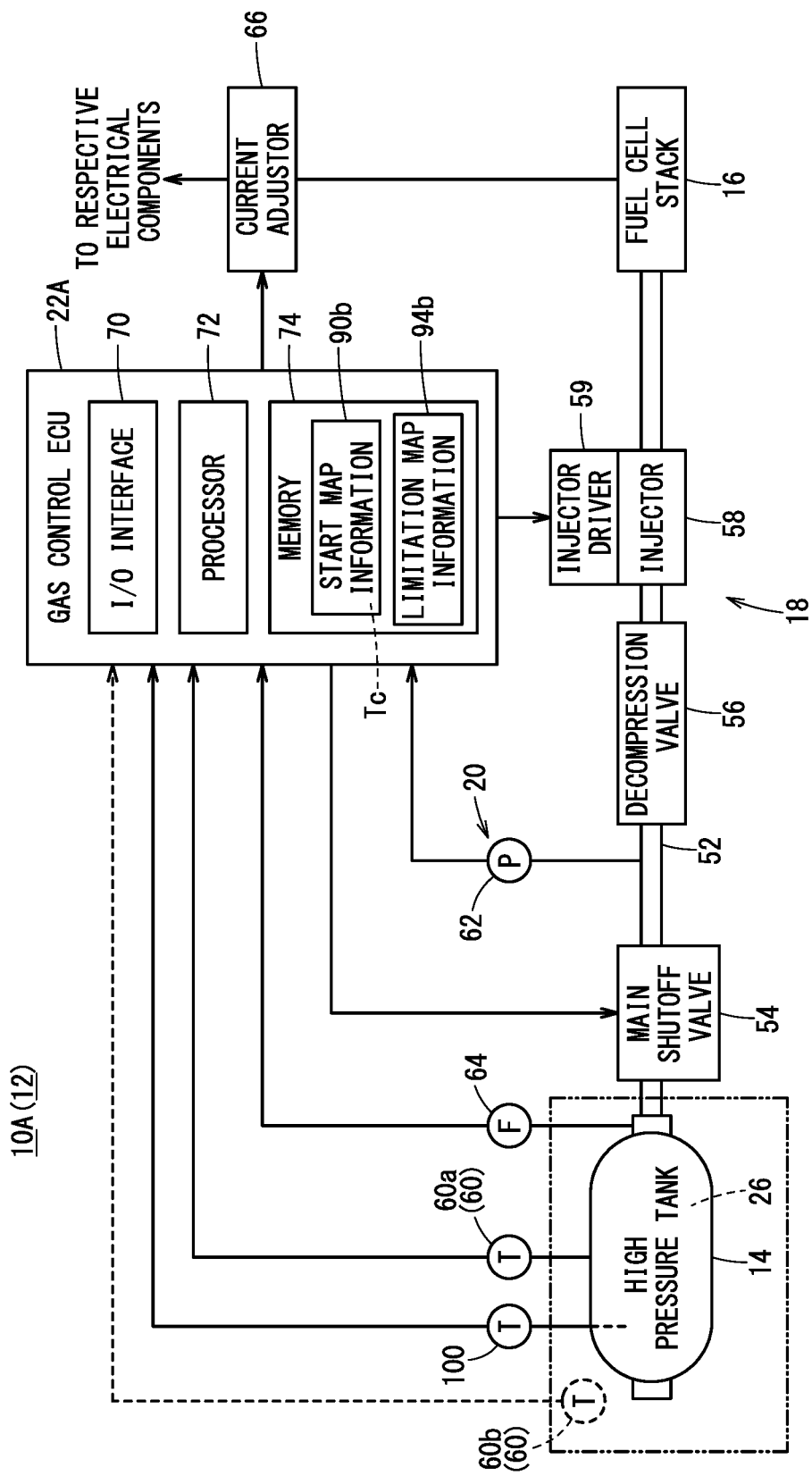
FIG. 10 is an illustrative diagram showing an overall configuration of a gas control system according to a second embodiment of the present invention.

A gas control system 10A according to a second embodiment shown in FIG. 10 differs from the gas control system 10 by inclusion of a tank interior temperature sensor 100 that detects the temperature inside the high pressure tank 14 (hydrogen gas storage space 26). A gas control ECU 22A of this system is configured to acquire information about the interior temperature detected by the tank interior temperature sensor 100, and estimate, based on the interior temperature information and the pressure information (the internal pressure of the high pressure tank 14), the volume of the cavity 50 of hydrogen gas formed in the boundary 29 between the liner 28 and the reinforcing layer 30.

Here, the volume of the cavity 50 is substantially constant when the internal pressure of the high pressure tank 14 is higher than a predetermined pressure, whereas the volume of the cavity 50 is inversely proportional to the pressure in the cavity 50 under a constant temperature when the internal pressure of the high pressure tank 14 is equal to or lower than the predetermined pressure. When the cavity 50 expands excessively, buckling occurs. That is, the gas control ECU 22A can accurately monitor the risk of buckling by estimating the volume of the cavity 50.

For example, the volume of the cavity 50 is estimated based on correlation information (not shown) stored in advance in the memory 74. The correlation information is formed of map information or a function capable of deriving the volume of the cavity 50 from the temperature inside the high pressure tank 14 (the interior temperature information) and the internal pressure (the pressure information) of the high pressure tank 14.

The determination processor 84 of the gas control ECU 22A sets a volume threshold Tc of the cavity 50, as the start threshold Ts, to be compared to the estimated volume of the cavity 50. The volume threshold Tc is extracted from start map information 90b that is configured to have different values for different temperatures (multiple temperature ranges) of the reinforcing layer 30. That is, the determination processor 84 sets a value for the volume threshold Tc according to the temperature information of the reinforcing layer 30, compares the estimated volume of the cavity 50 with the volume threshold Tc, and determines switching (starting) of the operation mode from normal control to limiting control.

The gas control system 10 according to the second embodiment described above implements limiting control by performing a process following the flowchart shown in FIG. 11. In FIG. 11, steps S11 to S13 are the same as steps S1 to S3 in FIG. 8A. At step S14, the gas control ECU 22A acquires interior temperature information from the tank interior temperature sensor 100 that detects the temperature inside the high pressure tank 14.

Then, the determination processor 84 of the gas control ECU 22A estimates the volume of the cavity 50 formed in the boundary 29 between the liner 28 and the reinforcing layer 30 based on the interior temperature information and the pressure information (step S15). Further, referring to the start map information 90b in the memory 74, the limitation starting condition setter 90 in the determination processor 84 sets the start threshold Ts (volume threshold Tc) according to the acquired temperature information (step S16).

Thereafter, the start determiner 92 in the determination processor 84 compares the estimated volume of the cavity 50 with the set volume threshold Tc, and determines whether or not the volume of the cavity 50 is equal to or greater than the volume threshold Tc (step S17). When the volume of the cavity 50 is smaller than the volume threshold Tc (step S17: NO), the process returns to step S2 and the same flow is repeated. When the volume of the cavity 50 is equal to or greater than the volume threshold Tc (step S17: YES), the process proceeds to step S18.

The case in which the volume of the cavity 50 is equal to or greater than the volume threshold Tc means a state that the hydrogen gas accumulated in the cavity 50 is expanding. Therefore, at step S18, the determination processor 84 switches operation modes from the operation by the normal operation controller 82 to the operation by the limiting operation controller 86, so that the gas control ECU 22A starts to implement limiting control. The limiting control in this case is the same as the limiting control of the gas control system according to the first embodiment. The gas control system 10A may be configured to adjust the flow rate of hydrogen gas in the limiting control, based on the estimated volume of the cavity 50.

The technical ideas and effects that can be grasped from the above embodiments are described as follows.

According to the first aspect of the invention, a gas control system 10, 10A includes: a high pressure tank 14 including a liner 28 made of resin and filled with a highly pressurized fluid (hydrogen gas), a reinforcing layer 30 covering the outer surface of the liner 28, and a discharge hole 34 for discharging the fluid from the liner 28; a temperature sensor 60 detecting the temperature of the reinforcing layer 30 or the temperature around the outside of the high pressure tank 14; a pressure sensor 62 detecting the pressure inside the liner 28; a flow rate adjustor (injector 58, current adjustor 66) adjusting the flow rate of the fluid discharged from the discharge hole 34, and a control unit (gas control ECU 22, 22A) controlling the operation of the flow rate adjustor. The control unit starts limiting control to limit the discharge of the fluid based on temperature information detected by the temperature sensor 60 and pressure information detected by the pressure sensor 62.

According to the above aspect, the gas control system 10, 10A can appropriately start the limiting control to limit the discharge of the fluid according to the temperature of the reinforcing layer 30 or the temperature around the outside of the high pressure tank 14. That is, when the temperature inside the liner 28 (the temperature of the reinforcing layer 30) is high, the amount of fluid that permeates the liner 28 from the inside of the liner 28 and moves to the reinforcing layer 30 is large. To deal with this, the gas control system 10, 10A starts the limiting control at an early stage to slow down the speed of decompression of the high pressure tank 14, thus making it possible to suppress deformation (buckling) of the liner 28. On the other hand, when the temperature inside the liner 28 (the temperature of the reinforcing layer 30) is low due to a low temperature environment or other influence, the amount of fluid that permeates the liner 28 from the inside of the liner 28 and moves to the reinforcing layer 30 is small. Therefore, the gas control system 10, 10A delays the start of the limiting control, thus making it possible to discharge the fluid from the high pressure tank 14 as usual for a long period of time. As a result, the gas control system 10, 10A can continuously and stably supply the fluid from the high pressure tank 14, hence enhance the commercial value thereof.

The control unit (gas control ECU 22) sets a pressure threshold Tp relating to the pressure inside the liner 28, based on the temperature information, compares the set pressure threshold Tp with the pressure information that is acquired, and starts the limiting control when the pressure indicated by the pressure information becomes equal to or lower than the pressure threshold Tp. By setting the pressure threshold Tp according to the temperature information in this way, the gas control system 10 can monitor the internal pressure of the high pressure tank 14 based on the pressure threshold Tp to favorably determine the start of the limiting control.

The pressure threshold Tp is set to a higher pressure value as the temperature detected by the temperature sensor 60 increases. As a result, when the temperature detected by the temperature sensor 60 is low, the pressure threshold Tp is lowered, so that the gas control system 10 may start limiting control at a stage after the internal pressure of the high pressure tank 14 has lowered to some extent.

The gas control system 10A further includes a tank interior temperature sensor 100 detecting the temperature inside the high pressure tank 14. The control unit (gas control ECU 22A) estimates the volume of the cavity 50 formed in a boundary 29 between the liner 28 and the reinforcing layer by the accumulation of the permeated fluid, based on the interior temperature information detected by the tank interior temperature sensor 100, sets a volume threshold Tc relating to the volume of the cavity 50 based on the temperature information, compares the estimated volume of the cavity 50 with the set volume threshold Tc, and starts the limiting control when the volume of the cavity 50 becomes equal to or greater than the volume threshold Tc. By monitoring the volume of the cavity 50 in this way, the gas control system 10A can determine the start of limiting control further preferably.

In performing the limiting control, the control unit (gas control ECU 22, 22A) sets a flow rate upper limit L of the fluid based on at least the temperature information, and controls the operation of the flow rate adjustor (injector 58, current adjustor 66) so that the flow rate of the fluid does not exceed the flow rate upper limit L. Thereby, the gas control system 10, 10A can appropriately set the flow rate upper limit L of the gas in the limiting control and adjust the discharging speed of the gas from the high pressure tank 14.

The control unit (gas control ECU 22, 22A) previously stores limitation map information 94a including multiple values for the flow rate upper limit L that are associated with the temperature detected by the temperature sensor 60 and the pressure detected by the pressure sensor 62, and extracts a value for the flow rate upper limit L that is based on the temperature information and the pressure information by referring to the limitation map information 94a when performing the limiting control. This enables the gas control system 10, 10A to set the flow rate upper limit L of the gas more accurately.

The high pressure tank 14 includes an exhaust path 48 that communicates with the cavity 50 formed in the boundary 29 between the liner 28 and the reinforcing layer 30 by the accumulation of the permeated fluid and that is capable of discharging the fluid from the cavity 50 to the outside of the high pressure tank 14, and the gas control system further includes a flow rate sensor 64 for detecting the discharge amount of the fluid discharged from the exhaust path 48. The control unit adjusts the flow rate of the fluid discharged from the high pressure tank 14, according to discharge amount information detected by the flow rate sensor 64. As a result, the gas control system 10, 10A can favorably control the flow rate of the fluid discharged from the high pressure tank 14 based on the flow rate of the fluid discharged from the exhaust path 48.

The second aspect of the invention resides in a gas control method for controlling the flow rate of a highly pressurized fluid discharged from a high pressure tank 14 including a liner 28 made of resin and filled with the fluid, a reinforcing layer 30 covering the outer surface of the liner 28, and a discharge hole 34 for discharging the fluid from the liner 28. The gas control method comprises a temperature acquisition step of detecting, with a temperature sensor 60, the temperature of the reinforcing layer 30 or the temperature around the outside of the high pressure tank 14; a pressure acquisition step of detecting, with a pressure sensor 62, the pressure inside the liner 28; and a flow rate control step of controlling, with the control unit (gas control ECU 22, 22A), the operation of a flow rate adjustor (injector 58, current adjustor 66) that adjusts the flow rate of the fluid discharged from the liner 28. In the flow rate control step, limiting control to limit the discharge of the fluid is started based on temperature information detected by the temperature sensor 60 and pressure information detected by the pressure sensor 62. Thus, since the gas control method limits the discharge of the fluid from the high pressure tank 14, appropriately according to the temperature, when the ambient temperature around the high pressure tank is low, it is possible to operate the fuel cell stack 16 continuously at high power while suppressing deformation of the liner 28, as compared to the condition where the ambient temperature is high.

In the flow rate control step, a pressure threshold Tp relating to the pressure inside the liner 28 is set based on the temperature information, the set pressure threshold Tp is compared with the pressure information that is acquired, and the limiting control is started when the pressure indicated by the pressure information becomes equal to or lower than the pressure threshold Tp. Thereby, the gas control method can favorably determine the start of the limiting control.

The gas control method further includes an interior temperature acquisition step of detecting, with a tank interior temperature sensor 100, the temperature inside the high pressure tank 14. In the flow rate control step, the volume of the cavity 50 formed in a boundary 29 between the liner 28 and the reinforcing layer 30 by the accumulation of the permeated fluid is estimated based on the interior temperature information detected by the tank interior temperature sensor 100, a volume threshold Tc relating to the volume of the cavity 50 is set based on the temperature information, the estimated volume of the cavity 50 is compared with the set volume threshold Tc, and the limiting control is started when the volume of the cavity 50 becomes equal to or greater than the volume threshold Tc. Thereby, the gas control method can more favorably determine the start of the limiting control.

What is claimed is:

1. A gas control system, comprising:
   a high pressure tank including a liner made of resin and filled with a highly pressurized fluid, a reinforcing layer covering an outer surface of the liner, and a discharge hole configured to discharge the fluid from the liner;
   a temperature sensor configured to detect a temperature of the reinforcing layer or a temperature around an outside of the high pressure tank;
   a pressure sensor configured to detect a pressure inside the liner;
   a flow rate adjustor configured to adjust a flow rate of the fluid discharged from the discharge hole; and
   a control unit including one or more processors that execute computer-executable instructions stored in a memory, wherein the one or more processors execute the computer-executable instructions to cause the gas control system to control an operation of the flow rate adjustor,
   wherein the one or more processors control the gas control system to:
   set a pressure threshold relating to the pressure inside the liner based on temperature information detected by the temperature sensor,
   compare the set pressure threshold with pressure information detected by the pressure sensor, and
   start limiting control to limit discharge of the fluid when the pressure indicated by the pressure information becomes equal to or lower than the pressure threshold, and
   wherein the pressure threshold is set to a higher pressure value as the temperature detected by the temperature sensor increases.

2. The gas control system according to claim 1, further comprising a tank interior temperature sensor configured to detect a temperature inside the high pressure tank,
   wherein the one or more processors estimate a volume of a cavity formed in a boundary between the liner and the reinforcing layer by accumulation of the permeated fluid, based on interior temperature information detected by the tank interior temperature sensor, set a volume threshold relating to a volume of the cavity based on the temperature information, compare the estimated volume of the cavity with the set volume threshold, and start the limiting control when the volume of the cavity becomes equal to or greater than the volume threshold.

3. The gas control system according to claim 1, wherein, in performing the limiting control, the one or more processors set a flow rate upper limit L of the fluid based on at least the temperature information, and control the operation of the flow rate adjustor so that the flow rate of the fluid does not exceed the flow rate upper limit.

4. The gas control system according to claim 3, wherein the one or more processors previously store limitation map information including a plurality of values for the flow rate upper limit that are associated with the temperature detected by the temperature sensor and the pressure detected by the pressure sensor, and extract a value for the flow rate upper limit that is based on the temperature information and the pressure information by referring to the limitation map information when performing the limiting control.

5. A gas control system, comprising:
a high pressure tank including a liner made of resin and filled with a highly pressurized fluid, a reinforcing layer covering an outer surface of the liner, and a discharge hole configured to discharge the fluid from the liner;
a temperature sensor configured to detect a temperature of the reinforcing layer or a temperature around an outside of the high pressure tank;
a pressure sensor configured to detect a pressure inside the liner;
a flow rate adjustor configured to adjust a flow rate of the fluid discharged from the discharge hole; and
a control unit including one or more processors that execute computer-executable instructions stored in a memory, wherein the one or more processors execute the computer-executable instructions to control the gas control system to control an operation of the flow rate adjustor, wherein:
the high pressure tank includes an exhaust path that communicates with a cavity formed in a boundary between the liner and the reinforcing layer by accumulation of the permeated fluid and that is configured to discharge the fluid from the cavity to the outside of the high pressure tank;
the gas control system further comprises a flow rate sensor configured to detect a discharge amount of the fluid discharged from the exhaust path; and
the one or more processors further control the gas control system to:
start limiting control to limit discharge of the fluid, based on temperature information detected by the temperature sensor and pressure information detected by the pressure sensor,
in performing the limiting control, set a flow rate upper limit of the fluid based on at least the temperature information, and control the operation of the flow rate adjustor so that the flow rate of the fluid does not exceed the flow rate upper limit, and
adjust a flow rate of the fluid discharged from the high pressure tank, according to discharge amount information detected by the flow rate sensor.

6. A gas control method for controlling a flow rate of a highly pressurized fluid discharged from a high pressure tank including a liner made of resin and filled with the fluid, a reinforcing layer covering an outer surface of the liner, and a discharge hole configured to discharge the fluid from the liner,
the gas control method comprising:
detecting, with a temperature sensor, a temperature of the reinforcing layer or a temperature around an outside of the high pressure tank;
detecting, with a pressure sensor, a pressure inside the liner; and
controlling an operation of a flow rate adjustor configured to adjust a flow rate of the fluid discharged from the discharge hole,
wherein, in controlling the operation of the flow rate adjustor, a pressure threshold relating to the pressure inside the liner is set based on temperature information detected by the temperature sensor, the set pressure threshold is compared with pressure information detected by the pressure sensor, and limiting control to limit discharge of the fluid is started when the pressure indicated by the pressure information becomes equal to or lower than the pressure threshold, and
wherein the pressure threshold is set to a higher pressure value as the temperature detected by the temperature sensor increases.

7. The gas control method according to claim 6, further comprising detecting, with a tank interior temperature sensor, a temperature inside the high pressure tank,
wherein, in controlling the operation of the flow rate adjustor, a volume of a cavity formed in a boundary between the liner and the reinforcing layer by accumulation of the permeated fluid is estimated based on interior temperature information detected by the tank interior temperature sensor, a volume threshold relating to a volume of the cavity is set based on the temperature information, the estimated volume of the cavity is compared with the set volume threshold, and the limiting control is started when the volume of the cavity becomes equal to or greater than the volume threshold.

* * * * *